United States Patent
Padmanabhan et al.

(10) Patent No.: US 6,219,638 B1
(45) Date of Patent: Apr. 17, 2001

(54) TELEPHONE MESSAGING AND EDITING SYSTEM

(75) Inventors: Mukund Padmanabhan, Ossining; Michael Picheny; David Nahamoo, both of White Plains; Salim Roukos, Scarsdale, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/185,332

(22) Filed: Nov. 3, 1998

(51) Int. Cl.[7] .......................... G10L 15/08; G10L 11/00; H04N 11/10
(52) U.S. Cl. .......................... 704/235; 704/231; 704/270; 704/251; 379/100.08; 379/93.24; 455/412
(58) Field of Search ................... 702/270, 271, 702/275, 277, 278, 235, 251

(56) References Cited

U.S. PATENT DOCUMENTS

| | | | |
|---|---|---|---|
| 5,051,924 | * 9/1991 | Bergeron et al. | 704/200 |
| 5,875,448 | * 2/1999 | Boys et al. | 704/260 |
| 5,920,835 | * 7/1999 | Huzenlaub et al. | 704/260 |

OTHER PUBLICATIONS

VoiceAssist™ (Creative Labs, "User's Guide," Jul. 1993.*
Talk> To Plus™ (Dragon Systems, "User's Guide", ©1992–1993).*
Rose et al (Richard C. Rose, Douglas A. Reynolds, "Text independent speaker identification using automatic acoustic segmentation," International Conference on Acoustics, Speech, and Signal Processing, Apr. 1990).*

* cited by examiner

*Primary Examiner*—David Hudspeth
*Assistant Examiner*—Daniel A. Nolan
(74) *Attorney, Agent, or Firm*—F. Chau & Associates, LLP

(57) ABSTRACT

A messaging system for receiving speech over a telephone and converting the speech to text includes a first server for receiving speech input by a user, a speech recognition system for converting the speech to text, a speech synthesizer for converting the text to speech for playing back the synthesized speech for correction by the user and a correction mechanism for enabling the user to correct the speech such that the corrected speech is provided as text for transmittal over a communication system.

23 Claims, 2 Drawing Sheets

TELEPHONE MESSAGING AND EDITING SYSTEM

GOVERNMENTAL INFORMATION

The U.S. Government has a paid-up license in this invention and the right in limited circumstances to require the patent owner to license others on reasonable terms of grant MDA972-97-C-0012 awarded by Defense and Advanced Research Projects Agency (DARPA).

BACKGROUND OF THE INVENTION

1. Field of the Invention

The present invention relates to editing systems for voice recognition and, more particularly, to a system and method for editing messages transcribed from speech from a telephone.

2. Description of the Related Art

Advances in personal communications in recent years have led to information being transmitted through a variety of channels to users, for instance speech, multi-media (figures and speech), text (e-mail, pagers), etc. Due to these advances, there has arisen the concept of unified whereby the messages received by a user through various media are stored in a single repository and can be retrieved or searched by the user at his/her convenience. Further, it may be the case that the user has only a personal digital assistant (PDA) with very limited capabilities through which to retrieve his messages. In general however, even the simplest of PDA's will support the reception of text, though it may not support the reception of multimedia signals. Consequently, it may be necessary to convert speech and multimedia signals into text so that the signals can be easily accessed. This also has implications on the bandwidth requirements for communication—text signals require less bandwidth than speech for transmission.

Voicemail is a commonly used messaging system wherein the speech of a person is recorded and subsequently played back by the recipient of the message. Hence, an important component of unified messaging is the capability to convert such messages into text. This can of course be done by using automatic speech recognition algorithms. However, voicemail messages typically represent spontaneous speech recorded over an unknown (the caller who is leaving the message may be halfway around the earth or next door) telephone bandwidth channel, and hence represent a very challenging task for automatic speech recognition systems. there is the danger of the transcribed text being so full of errors that the recipient of the message may not be able to decipher the message at all. Hence, it is advantageous to incorporate some form of feedback mechanism whereby the person leaving the message can check the quality of the transcription and correct it if necessary.

Therefore, a need exists for an interactive system and method for converting speech data into text and incorporating the feature of correction of the transcribed text by voice.

SUMMARY OF THE INVENTION

A messaging system, in accordance with the present invention, for receiving speech and converting the speech to text includes a first server for receiving speech input by a user, a speech recognition system for converting the speech to text, a speech synthesizer for converting the text to speech for playing back the synthesized speech for correction by the user and a correction mechanism for enabling the user to correct the speech such that the corrected speech is provided as text for transmittal over a communication system. other embodiments, the text for transmittal over the communication system may include transmittal to one of a pager, email and fax. The correction mechanism may prompt the user to select portions of the speech input for correction. The speech recognition server may provide diagnostic data to the correction mechanism to indicate portions of the speech input to be corrected. The correction mechanism may prompt the user to rerecord portions of the speech input for correction. The system may further include a language translation server for converting the speech input to text for transmittal over the communication system in a different language. The system may further include a speaker identification server for identifying the user and for adjusting speech recognition models for speech recognition by the speech recognition server.

A method for correcting messages for a universal messaging system includes the steps of recording an audio message, transcribing the message to text using a speech recognition system, providing speech in accordance with the transcribed text for playing back the message for correction, identifying portions of the message to be corrected, correcting the message by re-recording the portions and outputting the text over a communication system.

A program storage device readable by machine, tangibly embodying a program of instructions executable by the machine to perform method steps for providing corrections to messages in a universal message system, includes the method steps of recording an audio message, transcribing the message to text using a speech recognition system, providing speech in accordance with the transcribed text for playing back the message for correction, identifying portions of the message to be corrected, correcting the message by re-recording the identified portions and outputting the text over a communication system.

In alternate methods which may be executable by the program storage device, the audio message is preferably recorded by telephone. The step of identifying portions of the message to be corrected may include the step of providing diagnostic data from the speech recognition server for determining a likelihood of correctness of the portions of the message. The step of identifying portions of the message to be corrected may include the step of listening to the played back message and selecting portions to be corrected. The step of correcting the message by re-recording the identified portions may include the steps of re-recording portions of the message, converting the re-recorded portions to revise the text using the speech recognition server, playing back speech of the re-recorded portions in accordance with the revised text and if acceptable, approving the portions of the message. The step of recording the message in a one of a plurality of languages may be included. The step of outputting the text in a one of a plurality of languages over the communications system may be included. The steps of identifying a user associated with speech recognition models and applying the models to recognize the audio input of the user may be included.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention relates to editing systems for voice recognition and, more particularly, to a system and method for editing messages transcribed from speech from a telephone.

Figure 1:
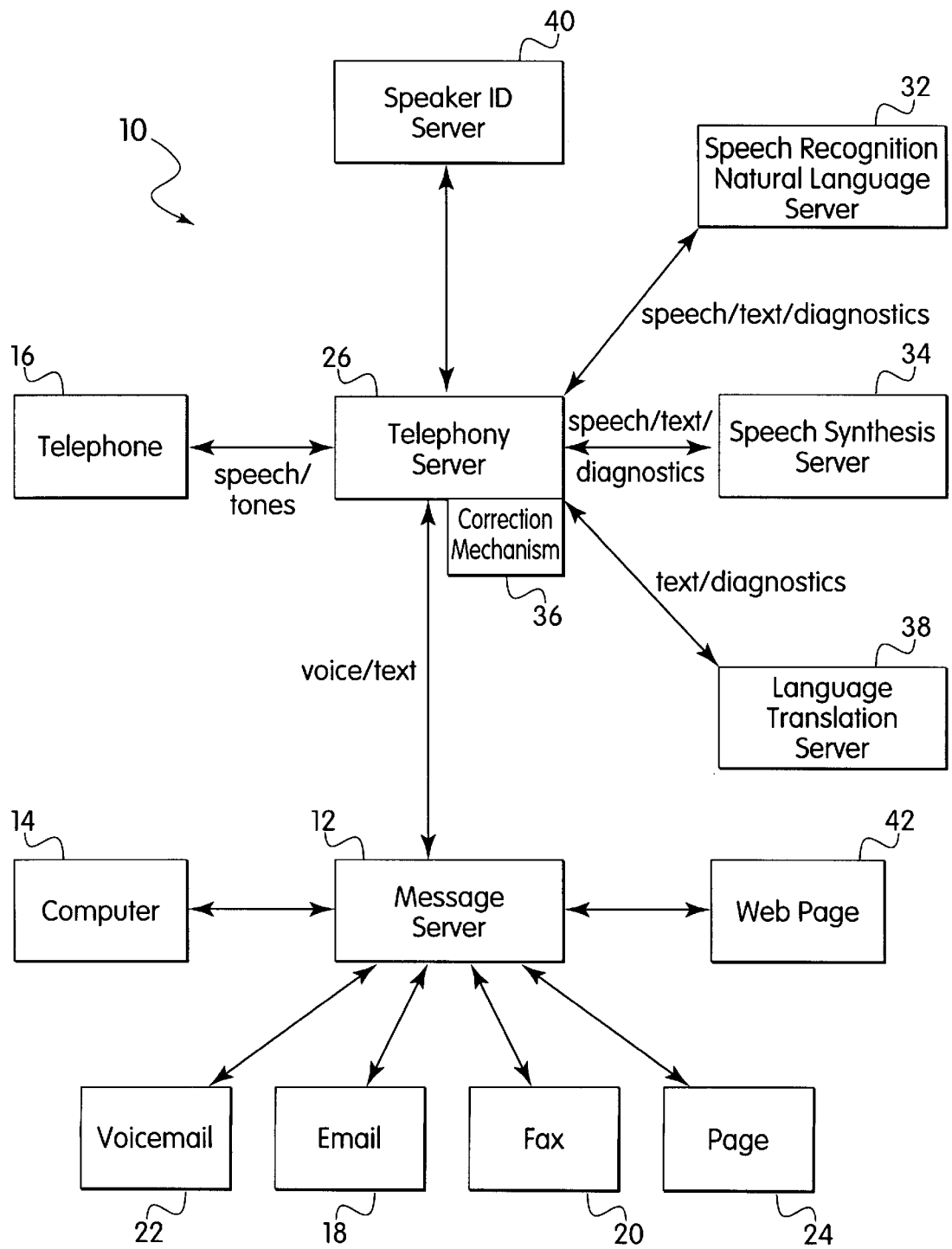
FIG. 1 is a block/flow diagram of a universal messaging system having a correction mechanism in accordance with the present invention.
Figure 2:
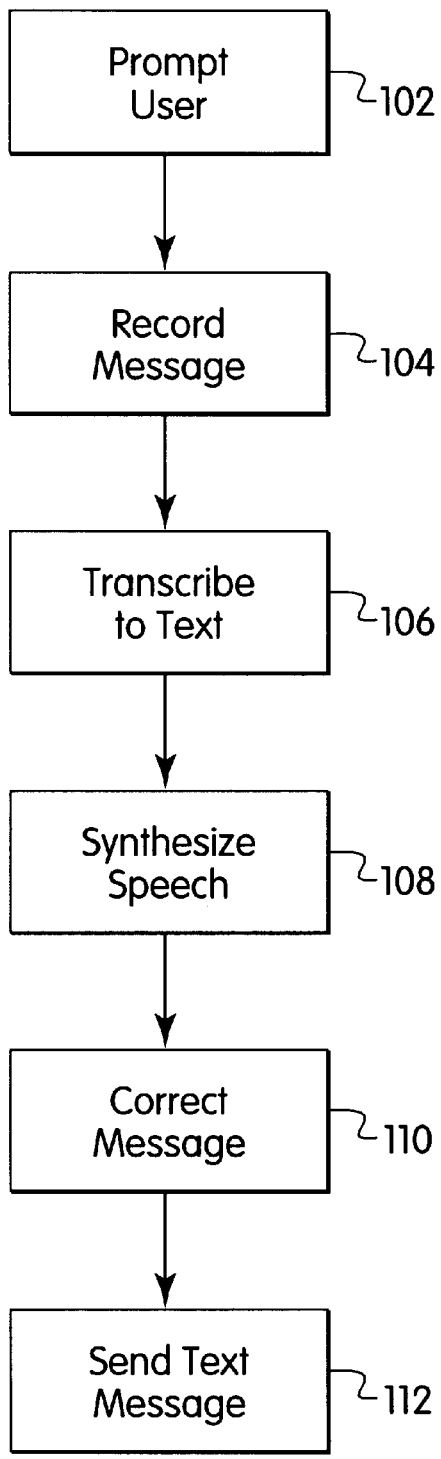
FIG. 2 is a flow diagram for correcting messages in accordance with the present invention.

It should be understood that the elements shown in FIGS. 1–2 may be implemented in various forms of hardware, software or combinations thereof. Preferably, these elements are implemented in software on one or more appropriately programmed general purpose digital computers having a processor and memory and input/output interfaces. Referring now to the drawings in which like numerals represent the same or similar elements and initially to FIG. 1, a block/flow diagram corresponding to a unified messaging system/method referred to generally as system 10. A message server 12 is a universal hub that receives/sends and stores all messages. Message server 12 can be accessed either through a computer 14, or through a telephone 16 for the of retrieving messages, or to send a message in one of several formats (email 18, fax 20, voicemail 22, page 24) also, some telephones and personal digital assistants (PDAs) can receive text messages), or to manipulate the users messages on message server 12, for example deletion, replying, etc. Further, message server 12 may also receive messages for the user directly via email 18, fax 20 or page 24.

Messages received over telephone 16 for the user may also be stored on message server 12, but there may be an additional telephony server 26 that serves as an intermediate bridge between the incoming speech signal from telephone 16 and message server 12. In an alternate embodiment, telephony server 26 may be include within message server 12. Telephony server 26 also controls the flow of information among components of system 10.

It is to be understood that the term "server" is used to indicate a program or computer that is running either on the same computer or on a different computer that is preferably accessible through a network.

A system/method will now be described in which a user may leave a message for another user using telephone 16, and the functionality of various system components involved in the method.

A telephone call is placed by a first user and is taken by telephony server 26, which then gives the first user the option of leaving a message for another user or retrieving the messages of the first user or manipulating the first user's messages. The options are provided to the first user through a prompt that is provided by telephony server 26. The first user may then be provided a choice of selecting one option, which may be specified either through a predefined tone (press 1 for option 1, press 2 for option 2, etc.) or by recording the verbal response of the first user and converting the speech to text by a speech recognition server 32, which may be similar to the system as described in L. R. Bahl et al., "Performance of the IBM Large Vocabulary Continuous Speech Recognition System on ARPA Wall Street Journal Task", Proceedings of the International Acoustics Speech and Signal Processing, 1995, incorporated herein by reference. The recognized text is used to determine which option the user has selected.

Where the first user wishes to leave a message for another user, system 10 gives the first user the option of storing a message directly as a voice message or converting the message to text. The user selects an option which may be specified as mentioned above through a tone or by speech. Where the user wishes to send a page to an alpha-numeric or to send the message in a different language, it may be necessary to convert the speech to text.

If the user specifies this option, then telephony server 26 plays a prompt asking the user to record the message. Once the message is recorded (the end of the message is preferably determined by checking for silence on the line, or by the user pressing a key), and the recorded speech is shipped to speech recognition server 32. Speech recognition server transcribes the speech to text using automatic speech recognition algorithms (possibly using natural language processing to filter the transcription) and transfers the transcribed text back to telephony server 26 with some diagnostics (such as the likelihood scores produced for each word in the utterance, or confidence measure relating to each word in the utterance, or duration of each word or subword, etc.

Telephony server 26 then transfers the text and diagnostics to a speech synthesis server 34 which produces synthesized speech and sends the speech back to telephony server 26. Telephony server 26 then plays the speech back to the user over the telephone line (note that this speech corresponds to the transcription produced by speech recognition server 32 which may be full of errors) in accordance with the invention.

One purpose of playing the speech back to the user is to enable the user to correct regions that are unacceptable or inaccurate. Telephony server 26 then advantageously provides the user with the option to correct the message.

The playback of the speech associated with a correction mechanism 36 may be accomplished in a number of ways. Some examples include (i) telephony server 26 plays the entire message back to the user and asks the user to re-record the message if it is unacceptable or inaccurate, (ii) telephony server 26 uses the confidence diagnostics received from speech recognition server 32 to determine regions of the transcript that have low confidence and asks the user to correct only those regions, (iii) telephony server 26 breaks the transcription into parts based on some measure, for example, based on elapsed time or based on pauses in the speech, and plays each part back to the user and gives the user the option of correcting each segment individually. Other methods of correction are contemplated by the present invention as well.

Correction mechanism 36 by which the user can correct any desired part of the message may also be accomplished in different ways. Some examples include (i) the user presses a key on telephone 16 to indicate acceptance or rejection of the message (or part of the message), and re-records the segment, which is then processed in a similar manner as described above (ii) the user says yes or okay or remains silent to indicate acceptance of the message or says no to indicate rejection. In this case, the response of the user is recorded and transcribed into text and the transcribed text (yes, okay, silence or no) determines the option that the user has chosen.

After the user is satisfied with the transcription, telephony server 26 sends the text along with the recorded speech to message server 12, with instructions to store it for later access, or send the text via email 18, fax 20 or page 24, as selected by the user over a communications network or system.

In an alternate embodiment, if the user desires the message to be sent in another language, then telephony server 26 sends the text to a language translation server 38 which uses automatic translation algorithms to convert the text to a different language and sends the translated text back to telephony server 26, which then sends the translated text to message server 12 for further processing.

In general, the speech recognition performance of speech recognition server 32 is improved if speaker specific or speaker adapted models are used while doing the transcription of the speech. Consequently, telephony server 26 may also communicate with a speaker identification server 40 to determine the identity of the calling user or alternatively, the user may be asked to say his/her name and use speech recognition server 32 with speaker independent models to transcribe the speech and use the transcription to determine the identity of the user. Once this has been determined, speech recognition server 32 may use models that have been tailored to the particular user or class of users (if available) to transcribe his/her speech.

In other embodiments, messages stored in message server may be delivered to multiple accounts/addresses/devices. For example, a saved transcribed message may be sent to a pager of a first group of users, emailed to a second group of users and/or faxed to a third user. System 10 may also be used to send the same message to a single user using different media, for example, a page and a fax, etc. Further, speech synthesis server 34 may be used to synthesize a text message and deliver it to a telephone or a voicemail system. In still other embodiments, each user may have a personal webpage 42 which is automatically updated when messages are transcribed for that user. Webpage 42 is accessed over a communications network, such as, the Internet.

Referring to FIG. 2, if the user specifies to record a message, a prompt plays asking the user to record the message in block 102. A message is recorded, in block 104, by speaking into a telephone or other acoustic input device (the end of the message is preferably determined by checking for silence on the line, or by the user pressing a key), and the recorded speech is shipped to a speech recognition server 32 (FIG. 1). In block 106, speech recognition server 32 transcribes the speech to text using automatic speech recognition algorithms (possibly using natural language processing to filter the transcription) and transfers the transcribed text back to telephony server 26 with some diagnostics (such as the likelihood scores produced for each word in the utterance, or confidence measure relating to each word in the utterance, or duration of each word or subword, etc.

In block 108, telephony server 26 then transfers the text and diagnostics to a speech synthesis server 34 which produces synthesized speech and sends the speech back to telephony server 26. Telephony server 26 then plays the speech back to the user over the telephone line in accordance with the invention(note that this speech corresponds to the transcription produced by speech recognition server 32 which may be full of errors).

In block 110, the user corrects regions that are unacceptable or inaccurate in the message. The playback of the speech for correction may be accomplished in a number of ways. Some examples include (i) the entire message is played back to the user and the user is asked to re-record the message if it is unacceptable or inaccurate, (ii) the confidence diagnostics received from speech recognition server 32 are used to determine regions of the transcript that have low confidence and the user is asked to correct only those regions, (iii) the transcription is broken into parts based on some measure, for example, based on elapsed time or based on pauses in the speech, and plays each part back to the user and gives the user the option of correcting each segment individually. Other methods of correction are contemplated by the present invention as well.

Parts of the message may be corrected individually. Some examples include (i) the user presses a key on telephone 16 to indicate acceptance or rejection of the message (or part of the message), and re-records the segment, which is then processed in a similar manner as described above (ii) the user says yes or okay or remains silent to indicate acceptance of the message or says no to indicate rejection. In this case, the response of the user is recorded and transcribed into text and the transcribed text (yes, okay, silence or no) determines the option that the user has chosen.

In block 112, after the user is satisfied with the transcription, telephony server 26 sends the text along with the recorded speech to message server 12, with instructions to store it for later access, or send the text via email 18, fax 20 or page 24, as selected by the user. The message may be converted to a different language if selected by the user for transmittal over a communications network, such as a telephone system. Further, the user may have specified a language in which the message is recorded in. This may be part of the speaker identification process described above.

Having described preferred embodiments of a system and method editing system and method for use with telephone messaging transcription (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by letters patent is set forth in the appended claims:

What is claimed is:

1. A messaging system for receiving speech and converting the speech to text comprising:

a first server for receiving speech input by a user;

a speech recognition system for converting the speech to text, the speech recognition system adapted to provide diagnostic data to indicate portions of speech input to be corrected;

a speech synthesizer for converting the text to synthesized speech for playing back the synthesized speech for correction by the user; and a correction mechanism receiving the diagnostic data from the speech recognition system for enabling the user to correct the synthesized speech such that the corrected speech is provided as text for transmittal over a communication system.

2. The system as recited in claim 1, wherein the text for transmittal over the communication system includes transmittal to a text reading device.

3. The system as recited in claim 1, wherein the correction mechanism prompts the user to select portions of the speech input for correction.

4. The system as recited in claim 1, wherein the correction mechanism prompts the user to, re-record portions of the speech input for correction.

5. The system as recited in claim 1, further comprises a language translation server for converting the speech input to text for transmittal over the communication system in a different language.

6. The system as recited in claim 1, further comprises a speaker identification server for identifying the user and for adjusting speech recognition models for speech recognition by the speech recognition server.

7. A method for correcting messages for a universal messaging system comprising the steps of:

recording an audio message;

transcribing the message to text using a speech recognition system including diagnostic data to indicate portions of speech input for correction;

providing speech in accordance with the transcribed text for playing back the message for correction;

identifying portions of the message for correction;

correcting the message by re-recording the identified portion; and outputting the corrected text over a communication system.

8. The method as recited in claim 7, wherein the audio message is recorded by telephone.

9. The method as recited in claim 7, wherein the step of identifying portions of the message to be corrected includes the step of listening to the played back message and selecting portions to be corrected.

10. The method as recited in claim 7, wherein the step of correcting the message by re-recording identified portions includes the steps of:

re-recording portions of the message;

converting the re-recorded portions to revise the text using the speech recognition server;

playing back speech of the re-recorded portions in accordance with the revised text; and if acceptable, approving the portions of the message.

11. The method as recited in claim 7, further comprises the step of recording the message in a one of a plurality of languages.

12. The method as recited in claim 7, further comprises the step of outputting the text in a one of a plurality of languages over the communications system.

13. The method as recited in claim 7, further comprises the steps of:

identifying a user associated with speech recognition models; and applying the models to recognize the audio input of the user.

14. A program storage device readable by machine, tangibly embodying a program of instructions executable by the machine to perform method steps for providing correction to messages in a universal message system, the method steps comprising:

recording an audio message;

transcribing the message to text using a speech recognition system including diagnostic data to indicate portions of speech input for correction;

providing speech in accordance with the transcribed text for playing back the message for correction;

identifying portions of the message to be corrected;

correcting the message by re-recording the identified portions; and outputting the corrected text over a communication system.

15. The program storage device as recited in claim 14, wherein the audio message is recorded by telephone.

16. The program storage device as recited in claim 14, wherein the step of identifying portions of the message to be corrected includes the step of listening to the played back message and selecting portions to be corrected.

17. The program storage device as recited in claim 14, wherein the step of correcting the message by re-recorded the identified portions includes the steps of:

re-recording portions of the message;

converting the re-recorded portions to revise the text using the speech recognition server;

playing back speech of the re-recorded portions in accordance with the revised text; and if acceptable, approving the portions of the message.

18. The method as recited in claim 14, further comprises the step of recording the message in a one of a plurality of languages.

19. The method as recited in claim 14, further comprises the step of outputting the text in a one of a plurality of languages over the communications system.

20. The method as recited in claim 14, further comprises the steps of:

identifying a user associated with speech recognition models; and applying the models to recognize the audio input of the user.

21. The system as recited in claim 1, wherein the diagnostic data includes confidence information.

22. The method as recited in claim 7, wherein the diagnostic data includes confidence information.

23. The program storage device recited in claim 14, wherein the diagnostic data includes confidence information.

* * * * *